Sept. 17, 1957 R. W. SPAKE 2,806,595
PACKAGED THERMOPLASTICS
Filed Jan. 17, 1956

INVENTOR
ROBERT W. SPAKE
BY Sol Shappirio
ATTORNEY

United States Patent Office 2,806,595
Patented Sept. 17, 1957

2,806,595
PACKAGED THERMOPLASTICS

Robert W. Spake, Plainfield, N. J., assignor to L. A. Dreyfus Company, Oak Tree, N. J., a corporation of New York Application January 17, 1956, Serial No. 559,699

10 Claims. (Cl. 206—84)

This invention relates to packaged thermoplastics and particularly to packaged thermoplastic material that enables ready release of the thermoplastic material including thermoplastic adhesives from the package, to methods of making such packaged products, and to methods of releasing said thermoplastic material from the package.

The packaging of thermoplastic materials including adhesives for general use on almost any surface including for example glass, polyethylene and other plastics, has been a serious problem.

If these materials are placed in shipping containers hot, they almost invariably adhere to the container walls. If packed cold, these thermoplastics often have an activation temperature low enough to adhere to container walls when subjected to summer temperatures while in transit. Even when silicone-coated papers are used for wrapping-sheets or container liners, unsatisfactory results are sometimes experienced due to the tendency of these thermoplastics to flow into folds and cracks in these papers and lock therein; furthermore, coatings of such papers are often found to migrate into the materials which they enclose, with consequent deleterious effects upon their properties.

Among the objects of the present invention is the packaging of thermoplastic materials such as thermoplastic adhesives by relatively simple packaging procedures that give stable packages from which the thermoplastic material is readily released.

Other objects include packaged thermoplastics as articles of commerce.

Further objects include methods of releasing the thermoplastic from the container.

Still further objects and advantages of the present invention will appear from the more detailed description set forth below, it being understood that such detailed description is given by way of illustration and explanation only, and not by way of limitation since various changes therein may be made by those skilled in the art without departing from the scope and spirit of the present invention.

In accordance with that more detailed description, the accompanying drawing shows the following.

Figure 1:
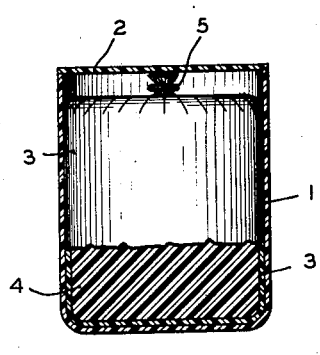
Figure 1 is a vertical transverse section through thermoplastic packaged in accordance with the present invention.
Figure 2:
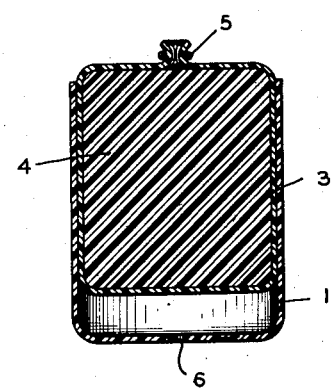
Figure 2 is a similar section showing a step in the process of removal of the liner carrying the solid thermoplastic from the container.

In accordance with the present invention it has been found that polyvinyl alcohol sheets formed for example by casting, may be readily formed into a tight liner or bag for the reception of the thermoplastic material, and used desirably within an outer container such as a drum, barrel, carton, box, bag, etc., particularly an open-head drum, etc. In this way a package is produced including a container, a separable polyvinyl alcohol liner for the container, and thermoplastic material which sticks to the polyvinyl alcohol packaged within the liner in intimate contact with the liner. The polyvinyl alcohol is desirably that which is substantially infusible below about 150° C. and substantially insoluble in water in the range of temperatures of from 32 to 150° F. within the time limit of release desired, usually a matter of minutes.

During the processing of thermoplastic materials, it is common practice to subject these materials to temperatures up to 150° C. in order to render them sufficiently fluid to handle in pumps or other process machinery. If such hot fluid thermoplastics are deposited in a container lined with polyethylene, for example, the liner may be partially fused or completely melted, and when the thermoplastic cools, it cannot be free from the container which encloses it. Polyvinyl alcohol, on the other hand, is not fused at these temperatures and can be advantageously used as a container liner where thermoplastics must be deposited in the package in molten form. This characteristic of polyvinyl alcohol container liners is of great commercial advantage, since it makes it possible to package thermoplastic materials immediately after the last processing step in their manufacture without the necessity of cooling the product or changing its state or form.

The in situ deposition of the thermoplastic may be into a polyvinyl alcohol casing, bag, container, etc., not positioned in an outer metallic or other protective receptacle such as drum, barrel, carton, box, bag, etc.; or the in situ deposition may take place into a fibre, metallic or other drum etc., having a separate polyvinyl alcohol liner.

Polyvinyl alcohol has been consistently ignored as a packaging material in the past because of its water sensitivity. Heretofore, materials selected for use as containers linesr, wrapping-sheets, etc. have usually been those capable of serving as moisture barriers to protect the contents of the package from the action of atmospheric moisture. Because polyvinyl alcohol readily transmits moisture and is swollen and dimensionally altered by the action of moisture vapor and liquid water, it has been regarded as unsuitable for most packaging applications. Many attempts have been made to render film made from polyvinyl alcohol insoluble in water to make it more suitable for such purposes. We have now found that the water sensitivity of polyvinyl alcohol may be utilized advantageously in the packaging system described by this invention, by providing a means of easily releasing the wrapping-sheet or container liner from the contents of the package.

Thermoplastic materials, when poured into our bag or liner, will adhere to the film of the bag or liner; however, when the bag, containing the thermoplastic material, is treated with water, the water penetrates the polyvinyl alcohol film, swelling it slightly and converting the inner surface of the liner to a release layer which separates automatically from the thermoplastic contents. This serves to release the film from the thermoplastic material quickly and completely.

Temperature of this water does not appear to be critical. Release normally occurs within two to five minutes after the application of the water, and the film can be stripped away from the thermoplastic material quite readily, although at this point the film should desirably have sufficient wet strength to stay in one piece under some small strain. A range of temperature of between about 32° F. and 150° F. is a desirable one for the water during the release step. Thus, the liner can best be removed by placing the liner and contents into a tank of water at about 110° F. Cooler water will make the release process slower. Water over 150° F. may dissolve the film. The polyvinyl alcohol used should therefore desirably be one that is relatively insoluble in water at the temperature of the release process.

Where the polyvinyl alcohol has been a liner, bag, etc. within an outer container such as a metal or fibre drum, a useful method of removing the liner, bag, etc. from the drum or other container is the following. Thus when thermoplastic materials are packaged in an open-head drum, using a polyvinyl alcohol liner, the drum can best be removed by removing the head, turning the drum upside down, and puncturing a small hole in the bottom of the drum. The drum by application of air pressure at the hole, can then be drawn away from the bag of thermoplastic, as a cylinder from a piston. This delivers the drum intact but for the hole, and perfectly clean, for reuse or resale.

Materials that may be packaged in accordance with the present invention include a wide variety of substances which are flowable at the temperature of packaging and may be liquid, molten, or solid including particularly particulate material of which the particles will coalesce. For present purposes we are, generally speaking, particularly concerned with those which are thermoplastic and adhesive to the polyvinyl alcohol. By adhesive is meant that the thermoplastic has greater adhesion to most packaging materials than the cohesion exhibited by the material to itself, so that upon attempt to remove the lining by stripping it from the material, substantial amounts of the latter adhere to the film; and in fact in some cases the adhesion may be so strong as to disrupt or break the film. This would include thermoplastic adhesives themselves. (It should be noted that the invention thus permits packaging in a plastic film adhesives which are especially designed to adhere to plastic films, such as polyethylene and cellophane.) Other products which might be packaged using this system include pressure sensitive adhesives, caulking compounds, sound deadening and sealing compounds, mastics, natural gums and resins, and their derivatives or fractions, polyvinyl ethyl ether and other polyvinyl ethers, polyisobutylene, asphalts, tars, polybutenes, S-polymers, laminating waxes, rosin derivatives, synthetic resins, and other materials of these types, as well as combinations of two or more of these materials, or blends wherein one or more of the above is an important constituent of the blend. Such materials now tend to adhere very tenaciously to the walls of their shipping containers. Removing materials of this type from the usual containers is a time-consuming and costly job. Normally heat is used to reduce the viscosity of the thermoplastic to a point where it can slowly flow from the container under its own weight. Because organic materials have poor heat transfer characteristics, the use of heat to effect release frequently results in local overheating and consequent decomposition of the thermoplastic. Furthermore, the use of heat often requires an expensive container designed to retain its shape under the conditions of the release step or to facilitate heat transfer to the contents of the container. In those cases where the material cannot be made to flow within a practical temperature range, the container must be slit, crushed, or otherwise destroyed to remove the contents.

Under my invention the wrapped product is not subjected to heat, and in many cases this would reduce surface tack and increase the ease of handling the unwrapped material. My packaging and release system will permit such products to be removed from containers readily and quickly, since product and polyvinyl alcohol wrapper can be removed easily from the outer drum or box, to which the liner does not, of course, adhere.

The polyvinyl alcohol film utilized may generally be said to be partially soluble, that is that it swells but does not dissolve in contact with water at temperatures used in the release process, except on prolonged exposure. The polyvinyl alcohol film is substantially stable at temperatures at which the packaged product is to be transported or stored, and should not block, become brittle, or lose tensile strength excessively on storage, since many of the thermoplastic materials to be packaged are often held in stock for over a year.

The film can be of varying thicknesses, and could be made from several types of polyvinyl alcohol, which have varying solubilities, and swelling characteristics. Plasticizers and chemicals can be added in manufacture to increase or decrease the solubility of the resultant film, which could also affect the rate of release of the film from the contents of the package and determine the water temperature at which release is best effected.

A typical commercial product that may be desirably used is one having the properties of "Reynolon 4301" in sheet form, .003" thick. In general, the particular polyvinyl alcohol mentioned shows the following properties: exceptionally high degree of impermeability to many gases including oxygen, nitrogen, hydrogen, carbon dioxide, helium and hydrogen sulfide, impervious to most oils, greases, paint, organic solvents and hydrocarbons, non-toxic, heat or electronic sealable, high tear and tensile strength, good elongation; thickness .001" to .008", a color water clear or translucent, modulus 2500 to 3500; tear 500–800 gm./mil, tensile 6000 to 10,000 p. s. i., elongation 400 to 600%, burns slowly, shows aging test of 50.0 hours (Atlas Fadeometer), gas permeability g./sq. m./hr./77° R. H.; $O_2$— .008, $CO_2$— .050, He .004, odor none to slight acidic, sealing thermal 300 to 340° F., water solubility slow under 50° F., rapid over 150° F., M. V. T. rate over 10 g. $H_2O$/100 sq. m./24 hrs./differential of 100% humidity one side 0% humidity other side.

In general a film forming material for use in connection with the present invention should have the properties indicated below; all may not be necessary for every application, but they are desirable where the method of packaging and release disclosed herein is to be employed most effectively:

(1) Form a tough, strong film, preferably transparent.

(2) Exhibit ability to allow water to pass through film readily and rapidly.

(3) Be dimensional unstable in the presence of an excess of water.

(4) Exhibit good wet strength (to permit peeling of wet film).

(5) Essential character of the surface of the film should change in the presence of an excess of water.

(6) In a majority of applications, oil insolubility will be essential, although this does not necessarily affect the release properties.

(7) Such a film, to be commercially practical, should be either heat sealable, or irreversibly cementable by standard means.

(8) The film forming material should desirably be non-toxic.

(9) The film must be temperature resistant. Since molten materials will be poured into it at 150° C. or above, the film should not melt, nor should its surfaces become tacky.

(10) The film should be stable over long periods of time necessary for storage of the packages and packaged product.

Polyvinyl alcohol film is a particularly desirable material to use for the present invention. Such film can be obtained exhibiting all of the properties set forth above and makes an ideal material for such use. For some purposes, the low gas permeability of polyvinyl alcohol packaging material toward many common gases (other than water vapor) is a desirable characteristic. Any other film exhibiting those characteristics set forth above wihch are essential for the particular use at hand, may be employed even though it does not exhibit all of the listed properties. Essential features that are basically important are temperature resistance, stability upon storage for substantial periods of time, and the controllable water release properties as indicated above. The surface conditions of the the film can be controlled to control speed of release, and while time of release is desirably rapid, it is a secondary factor.

Polyvinyl alcohol is unique among packaging materials utilizable in carrying out the present invention. Carboxy methyl cellulose which may be useful for some purposes exhibits too ready solubility in water at low temperatures to use in our system of packaging. Non-moisture proof cellophane works adequately, but its use is limited because it does not age well, becoming brittle in six months or less. This restricts commercial exploitation since thermoplastic materials desirably packaged under this invention are often held in stock for over a year.

The drums used may be of fiber or of fiber except for a metal bottom. Such fiber drums or other containers provided with polyvinyl alcohol liners are particularly useful since it enables the fiber drums to be reused upon removal of the thermoplastic material. Desirably the drum is provided with a hole or perforation in the bottom for use in release of the thermoplastic. The opening may be of any desired size such as ½ to ¾". It may be covered with a temporary removable closure. Metal drums of conventional type may also be used.

As exemplary of a package made in accordance with the present invention, Figure 1 illustrates open-head fibre or metal drum 1 having cover 2, the drum having polyvinyl alcohol liner 3 within which the thermoplastic 4 such as polyvinyl ethyl ether has been deposited in situ in flowable condition, and pemitted to solidify, and the polyvinyl alcohol liner closed by tying off (5) and drum closed by cover 2.

To remove the liner carrying thermoplastic from the drum, cover 2 is removed and opening 6 formed in the drum. An air line (not shown) may be applied to opening 6 to drive the lining and thermoplastic as a unit from the drum 1.

Figure 3:
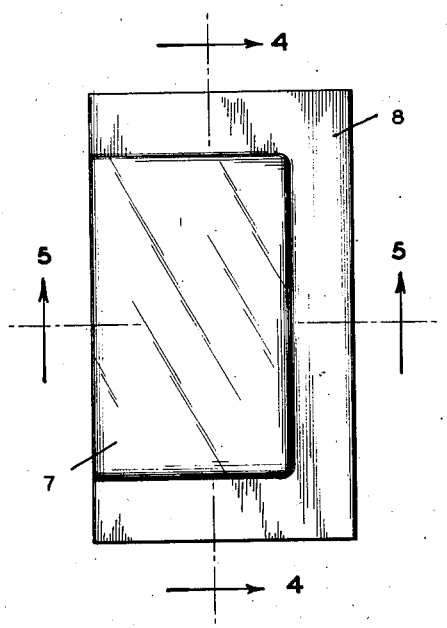
Figure 3 is a plan view of another form of package.
Figure 4:
Figure 4 is a section on line 4—4 of Figure 3.
Figure 5:
Figure 5 is a section on line 5—5 of Figure 3.

Or as shown in Figure 3, a mass of thermoplastic 7 may be wrapped in a polyvinyl alcohol sheet 8 to which adherence takes place forming a package. Release may be carried out in any of these cases by the methods set forth herein.

Example I

A typical thermoplastic alhesive having the following formula:

| | Percent |
|---|---|
| Polyvinyl ethyl ether | 37 |
| Copolymer | 11 |
| Copal resin | 25 |
| Di hydro Abitol alcohol | 11 |
| Petroleum wax | 5 |
| "Kenflex" resin N | 11 |
| | 100 | was prepared and poured into a prepared liner fabricated from polyvinyl alcohol film (Reynolon 4201); the adhesive being hot (140° C.) and fluid at the time of pouring. The thermoplastic mass was allowed to cool to room temperature, and upon examination, was found to be firmly adhered to the polyvinyl alcohol film liner. The liner and contents were removed from the containing can and immersed in a water bath held at 110° F. The liner was completely released from the thermoplastic adhesive in two minutes. In the above given formulation, the copolymer was a high molecular weight copolymer of isobutylene and styrene, the latter being 40% by weight. The petroleum wax was a low melting point petroleum wax commonly used for laminating.

In contrast, a duplicate experiment was attempted using a liner made from 2 mil. polyethylene film. This experiment was unsuccessful, as the polyethylene film melted, and the adhesive flowed through and around the liner, adhering most tenaciously to the metal outer container.

Example II

A quantity of polyvinyl ethyl ether was poured into a liner made from polyvinyl alcohol film (Reynolon 4301) at 75° F. Liner and contents were later placed in a water bath held at 40° F., and the polyvinyl ethyl ether was found to be completely released from the polyvinyl alcohol film in 15 minutes. While the dry polyvinyl alcohol film had adhered to the polyvinyl ethyl ether most tenaciously, the wet film would not adhere to the polyvinyl ethyl ether even when in contact with the polyvinyl ethyl ether.

Example III

Chicle, a natural gum, was heated to 115° C. and poured into a liner made of polyvinyl alcohol film inserted in a metal container. The thermoplastic gum was allowed to cool to room temperature and was found to be adhered firmly to the polyvinyl alcohol liner. Upon immersion for five minutes in a water bath held at 110° F., the liner was released from the chicle completely and could easily be stripped away. Again, the surfaces of the outer can, which had been in contact with the polyvinyl alcohol liner, was found to be completely clean.

Example IV

Low molecular weight polyisobutylene was placed in a liner made from polyvinyle alcohol film and placed in an oven set at 100° C. When can and contents reached equilibrium temperature, they were removed from the oven, and allowed to cool to room temperature. Liner and contents were removed from the containing can, and immersed in a water bath at 110° F. The low molecular weight polyisobutylene released completely from the polyvinyl alcohol film liner in two minutes.

In contrast, polyisobutylene placed in a bag of 2 mil. polyethylene film at room temperature, was found to adhere very tenaciously, and could not be released by immersion in water, or by any other means tried.

Example V

Polyvinyle ethyl ether in slab form, was heat sealed into an envelope made from polyvinyl alcohol, not supported by an outer container. The sealed pouch was then placed in a Carver laboratory press, and subjected to 2000 p. s. i. at 200° F. for two minutes. At the end of this time, the polyvinyl ethyl ether was tenaciously adhered to the inner surface of the pouch. The pouch and contents were cooled to room temperature and after a storage period the pouch and contents were immersed in a water bath held at 110° F. After five minutes the polyvinyl ethyl ether was observed to be completely free from the walls of the pouch.

Example VI

A quantity of 160°–180° F. oxidized asphalt was melted and poured at 130° C. into a bag made from polyvinyl alcohol film. After cooling to room temperature, bag and contents were immersed in a water bath held at 125° F. Before immersion, the asphalt was observed to be tightly adhered to the polyvinyl alcohol film. After immersion, the asphalt was observed to release from the film completely in one minute.

Having thus set forth my invention, I claim:

1. As a package, a container provided with a separable polyvinyl alcohol liner for said container for packaging thermoplastic material which sticks to said polyvinyl alcohol packaged within said liner in intimate contact therewith, the polyvinyl alcohol being substantially infusible, and substantially insoluble in water in the range of temperatures of from 32 to 150° F. within the time necessary to obtain release, and being substantially stable at ambient temperature.

2. The method of packaging thermoplastic material by depositing in flowable condition, thermoplastic material which sticks to polyvinyl alcohol, within a container having a separable polyvinyl liner in intimate contact therewith, the polyvinyl alcohol being substantially infusible, and substantially insoluble in water in the range of temperatures of from 32 to 150° F. within the time necessary to obtain release, and being substantially stable at ambient temperature.

3. The method of claim 2 in which the container is an open-head drum and the liner carrying thermoplastic is removed from the drum by inverting the drum, and applying gas below the liner to force out the liner carrying thermoplastic.

4. The method of packaging, storing, transporting and releasing solid thermoplastic materials by depositing in flowable condition synthetic thermoplastic material which sticks to polyvinyl alcohol, within a container having a separable polyvinyl alcohol liner in intimate contact therewith, the polyvinyl alcohol being substantially infusible, and substantially insoluble in water in the range of temperatures of from 32 to 150° F. within the time necessary to obtain release and being substantially stable at ambient temperatures, storing said packaged thermoplastic, transporting it to a point of use, removing the separable liner carrying the thermoplastic material from the container, moistening the liner to cause it to release from the thermoplastic material, and separating the latter from the liner material.

5. The method of claim 4 in which the container is a fiber drum having a perforation in the bottom thereof.

6. As a package, a polyvinyl alcohol casing enveloping a thermoplastic material which sticks to polyvinyl alcohol in intimate contact therewith, the polyvinyl alcohol being substantially infusible, and substantially insoluble in water in the range of temperatures of from 32 to 150° F. within the time necessary to obtain release, and being substantially stable at ambient temperature.

7. The package of claim 6 in which the thermoplastic material is deposited within said casing while in flowable condition.

8. The method of packaging thermoplastic material by depositing synthetic material which sticks to polyvinyl alcohol in flowable condition within a polyvinyl alcohol casing in intimate contact therewith, the polyvinyl alcohol being substantially infusible below about 150° C., and substantially insoluble in water in the range of temperatures of from 32 to 150° F. within the time limit of release desired, and being substantially stable at ambient temperature.

9. The method of releasing packaged thermoplastic as in claim 8 by moistening the casing to cause it to release from the thermoplastic material and separating the latter.

10. The method of claim 9 in which the moistening is effected by placing the casing in water at temperatures between about 32° and 150° F.

References Cited in the file of this patent

UNITED STATES PATENTS

| | | |
|---|---|---|
| 2,572,959 | Sparks et al. | Oct. 30, 1951 |
| 2,639,808 | Barry et al. | May 26, 1953 |
| 2,666,523 | Ryan et al. | Jan. 19, 1954 |
| 2,750,027 | Cummings | June 12, 1956 |